Dec. 17, 1929.   R. K. WINNING   1,739,812
FRICTION DETENT
Filed Jan. 7, 1926
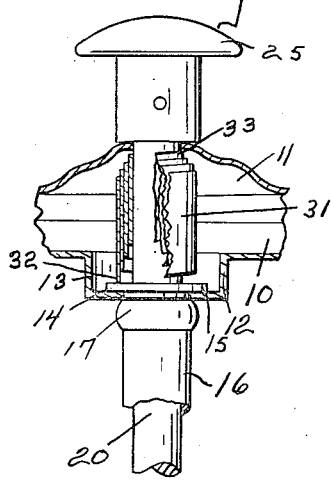
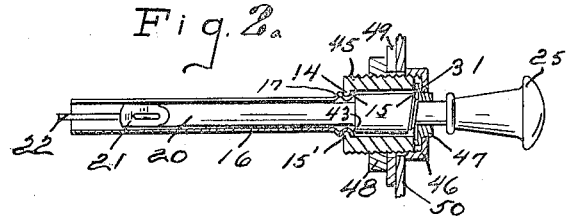
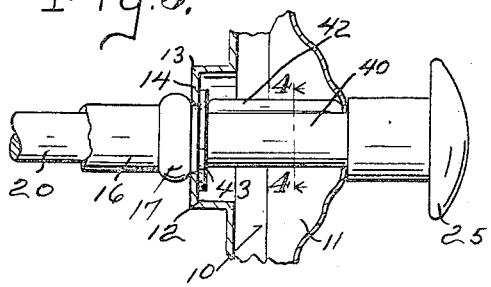
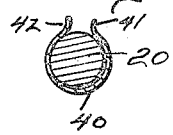
INVENTOR.
Robert K. Winning
BY Erwin, Wheeler & Howard
ATTORNEYS Patented Dec. 17, 1929

1,739,812

UNITED STATES PATENT OFFICE

ROBERT K. WINNING, OF WAUWATOSA, WISCONSIN, ASSIGNOR TO CLUM MANUFACTURING COMPANY, OF MILWAUKEE, WISCONSIN

FRICTION DETENT

Application filed January 7, 1926. Serial No. 79,760.

This invention relates to improvements in friction detents.

The invention is peculiarly adapted for application to choke rods and the like in automotive practice. It is the purpose of the invention to provide novel and improved means for yieldably detaining with substantially constant resistance an axially movable control rod.

In the drawings:

Figure 1 is a vertical axial section through a device embodying this invention and adapted for application to the dashboard of a motor vehicle for the control of choke and throttle mechanism, a portion of a contractile spring upon the choke rod being broken away;

Figure 2 is a view similar to Fig. 1 showing the use of a volute spring in a somewhat different form of case;

Figure 3 is a detail view similar to Fig. 1 but on an enlarged scale and illustrating the use of a modified form of contractile spring;

Figure 4 is a detail taken in section in the plane indicated by line 4—4 of Fig. 3.

Like parts are identified by the same reference characters throughout the several views.

While the control rod assemblies herein disclosed may be mounted in any desired manner, I have illustrated such assemblies as being mounted in a casing 10 peculiarly designed for the purpose. This casing includes the front and rear walls 11 and 12, respectively. The rearwardly embossed portion 13 of the casing wall 12 has an annular flange 14 which engages the upset end or terminal flange 15 on a tube 16. A bead 16 on the tube co-operates with the upset end 15 thereof to engage the annular flange 14 and thereby rigidly to support the tube.

The control rod 20 herein disclosed is utilized to operate a Bowden wire control 22. The end portion 21 of the rod is reduced to receive connection with the wire 22 and the tube 16 may conveniently be embossed at its extremity 23 to provide threads of a size and shape to conform to successive turns in the helical coil 24 which comprises a sheath for the axially adjustable control wire 22. In order to facilitate the manually axial manipulation of control rod 20 such rod is preferably provided with a knob or head at 25 where it projects through the front wall 11 of casing 10.

In order frictionally to maintain each rod 20 in any given desired position of adjustment I position thereon a spring 30 which is of a diameter normally smaller than the diameter of the rod upon which it is placed. In order to get the rod 20 into the spring it is necessary to use sufficient force to expand the spring. Thereupon the natural contractile pressure of the spring will frictionally engage it with the rod.

The length of the spring is such as to maintain it under moderate compression between the front and rear plates of wall 12 of casing 10. Being thus under moderate pressure the spring will be immovable axially within the casing and each movement of the rod 20 will require a relative movement between the rod and spring. Such relative movement is opposed by friction induced by the contractile pressure of the spring on the rod and accordingly there is a tendency for the rod to remain in any given position of adjustment.

In Figure 1 I disclose the use of a contractile volute spring 31 which is closely rolled from a flat strip of spring bronze or the like to have an interior diameter somewhat less than the diameter of the shaft to which it is applied. The interior coil of the spring is projected axially in order that the ends of the spring may abut the opposite walls of the casing in the manner indicated. This spring, like that shown in Figure 3, has the advantage of having an extended area of contact between the spring and the shaft which it embraces. Spring 31, however, accommodates itself readily to slight variations in the width of the casing in which it is housed, whereas the flat spring shown in Figures 3 and 4 is of constant length. Spring 31 has the further advantage that its successive coils reinforce the contractile pressure exerted by the innermost coil of the volute spring upon shaft 20 and it is possible to control frictional resistance by varying the number of turns of the spring.

The spring is preferably so positioned in the housing that the end of the spring represented by its outermost coil as at 32 contacts with the upset or riveted end portion 14 of the tube 16. The larger diametered end 32 of the spring is at such a distance from the shaft 20 due to the interposition of the inner coils of the spring that there will be little or no possibility of wedging of end 32 between the shaft and the riveted portion 14 of tube 16. The smaller diametered end 33 of spring 31 may conveniently bear against wall 11 of the housing which has no rounded margin in which the spring could wedge.

In Figure 2 I have shown the volute spring used in a somewhat different style of case. The shell 45 houses volute spring 31 and is provided at its rear end with a terminal flange 15' with which the upset end 14 of tube 15 is engaged. An annular nut 46 threaded to the other end of tube 45 secures to the end of the tube a closure 47 provided with an opening through which control shaft 20 is slidable. The volute spring 31 is confined between closure 47 and the upset extremity 14 of tube 15. A nut 48 acts through a lock washer 49 to clampingly engage the dash 50 against nut 46 whereby the entire device is positioned. The illustration in Figure 4 is approximately the actual size of the device in practice and illustrates how compactly this form of friction mechanism may be designed.

The construction disclosed in Figures 7 and 8 operates on the same principle as the device shown in Figures 1 and 2. But instead of using a helical wire spring I have illustrated in Figures 3 and 4 a spring 40 in the form of a split tube which embraces rod 20 and exerts a contractile pressure thereon. Preferably the split margins of the tube are formed with outwardly or radially projecting flanges 41 and 42. These flanges are not at all essential to the contractile effect of the spring upon rod 20 but are desirable in that they permit the use of extremely thin material in forming the spring.

It will be noted that due to the fact that the extremity 15 of tube 16 is spun or otherwise upset into engagement with flange 14 of the casing there will not be at 43 a perfectly square cut margin. If very thin material were used in the construction of springs 40 and if no precautions were taken, the thin tubular wall of the spring might become wedged between the rounded corner 43 and rod 20. Where the flanges 41 and 42 are used, however, they will abut the flat end of flange 15 and will prevent the possibility of any such wedging action.

I claim:

1. The combination with a reciprocable rod having a substantially cylindrical surface, of a split tubular contractile spring encircling said surface and exerting a substantially uniform pressure thereon, and means confining said spring against axial movement.

2. The combination with a cylindrical and axially movable control rod, of a frictional detent spring including a resiliently contractile strip extending circumferentially about said rod and presenting thereto a substantially cylindrical inner surface contacting with said rod whereby to act with substantial constant pressure upon said rod in all positions thereof.

3. In combination, a mounting member having spaced openings, a control rod adjustable through said openings and provided with a substantially smooth cylindrical bearing surface, and a split tubular contractile spring fixed by said member and encircling said surface in frictional bearing contact therewith, whereby to offer substantially uniform frictional opposition to the adjustment of said rod in various positions thereof.

4. The combination with a support including apertured spaced spring confining members, of a cylindrically surfaced rod axially reciprocable through said aperture and a split tube disposed between said members and resiliently contractile upon said rod, said tube being provided with a marginal flange adapted to facilitate the maintenance of its position between said members and to prevent wedging of said tube in said apertures.

ROBERT K. WINNING.